(12) United States Patent
Weston et al.

(10) Patent No.: US 8,266,083 B2
(45) Date of Patent: Sep. 11, 2012

(54) LARGE SCALE MANIFOLD TRANSDUCTION THAT PREDICTS CLASS LABELS WITH A NEURAL NETWORK AND USES A MEAN OF THE CLASS LABELS

(75) Inventors: Jason Weston, New York, NY (US); Ronan Collobert, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 736 days.

(21) Appl. No.: 12/364,059

(22) Filed: Feb. 2, 2009

(65) Prior Publication Data
US 2009/0204556 A1    Aug. 13, 2009

Related U.S. Application Data

(60) Provisional application No. 61/026,854, filed on Feb. 7, 2008.

(51) Int. Cl.
*G06F 15/00* (2006.01)
(52) U.S. Cl. .......................................................... 706/45
(58) Field of Classification Search .................... 706/12, 706/21, 45
See application file for complete search history.

(56) References Cited

OTHER PUBLICATIONS

Collobert et al., Large Scale Transductive SVMs, Aug. 2006, Journal of Machine Learning Research 1, pp. 1687-1712.*
Ouali et al., Cascaded Multiple Classifiers for Secondary Structure Prediction, 1999, University of Wales, pp. 1162-1176.*
Kittler et al., On Combining Classifiers, 1996, IEEE, pp. 1-14.*
Heisele et al., Learning and Vision Machines, 2002, IEEE, pp. 1-14.*
Chapelle et al., Semi-Supervised Calssification by Low Density Separation, AISTAT, 2005, pp. 1-8.*
Melvin, et al., Combining classifiers for improving classification of proteins from sequence or structure, Jan. 2008, BMC BIoinformatics, pp. 1-9.*

* cited by examiner

*Primary Examiner* — David Vincent
(74) *Attorney, Agent, or Firm* — Joseph Kolodka; Paul Schwarz

(57) ABSTRACT

A method for training a learning machine for use in discriminative classification and regression includes randomly selecting, in a first computer process, an unclassified datapoint associated with a phenomenon of interest; determining, in a second computer process, a set of datapoints associated with the phenomenon of interest that is likely to be in the same class as the selected unclassified datapoint; predicting, in a third computer process, a class label for the selected unclassified datapoint in a third computer process; predicting a class label for the set of datapoints in a fourth computer process; combining the predicted class labels in a fifth computer process, to predict a composite class label that describes the selected unclassified datapoint and the set of datapoints; and using the combined class label to adjust at least one parameter of the learning machine in a sixth computer process.

9 Claims, 2 Drawing Sheets

LARGE SCALE MANIFOLD TRANSDUCTION THAT PREDICTS CLASS LABELS WITH A NEURAL NETWORK AND USES A MEAN OF THE CLASS LABELS

RELATED APPLICATION

This application claims the benefit of U.S. Provisional Application No. 61/026,854, filed Feb. 7, 2008, the entire disclosure of which is incorporated herein by reference.

FIELD

The present disclosure relates to machine learning. More particularly, the present disclosure relates to methods for training learning machines with unlabeled data.

BACKGROUND

Several methods for improving discriminative classifiers using unlabeled data have been developed in the last few years. Perhaps the two most popular ways of utilizing the unlabeled data are: maximizing the margin on the unlabeled data as in Transductive Support Vector Machines (TSVM) so that the decision rule lies in a region of low density; and learning the cluster or manifold structure from the unlabeled data as in cluster kernels, label propagation, and Laplacian SVMs. Both approaches can be seen as making the same structure assumption on the data, that the cluster or manifold structure in the data is correlated with the class labels of interest.

The Low Density Separation algorithm (LDS) is a two-stage algorithm that combines both of these approaches, with improved results over using only one of the techniques, however the combination method is somewhat ad-hoc.

One problem with these methods is that they each suffer from an inability to scale to very large datasets, apart from in the linear case. This is ironic because the potential gain of semi-supervised learning lies in the vast amounts of readily available unlabeled data. This performance gain is never attained simply because of the computational burden of calculating the result.

Accordingly, a new learning method which uses unlabeled data is needed which overcomes the problems associated with existing methods.

SUMMARY

A method is disclosed herein for training a learning machine for use in discriminative classification and regression. In the method an unclassified datapoint associated with a phenomenon of interest is randomly selected in a first computer process. A set of datapoints is determined in a second computer process, which set is associated with the phenomenon of interest that is likely to be in the same class as the selected unclassified datapoint. In a third computer process, a class label for the selected unclassified datapoint is predicted in a third computer process. A class label is predicted for the set of datapoints in a fourth computer process. The predicted class labels are combined in a fifth computer process, to predict a composite class label that describes the selected unclassified datapoint and the set of datapoints. The combined class label is used to adjust at least one parameter of the learning machine in a sixth computer process.

An apparatus is disclosed herein for use in discriminative classification and regression. The apparatus comprises an input device for inputting unclassified datapoints associated with a phenomenon of interest; a processor; and a memory communicating with the processor. The memory comprises instructions executable by the processor for implementing a learning machine and training the learning machine by: randomly selecting one of the unclassified datapoints associated with the phenomenon of interest; determining a set of datapoints associated with the phenomenon of interest that are likely to be in the same class as the selected unclassified datapoint; predicting a class label for the selected unclassified datapoint; predicting a class label for the set of datapoints; combining the predicted class labels to predict a composite class label that describes the selected unclassified datapoint and the set of datapoints; and using the combined class label to adjust at least one parameter of the learning machine.

DETAILED DESCRIPTION

Figure 1:
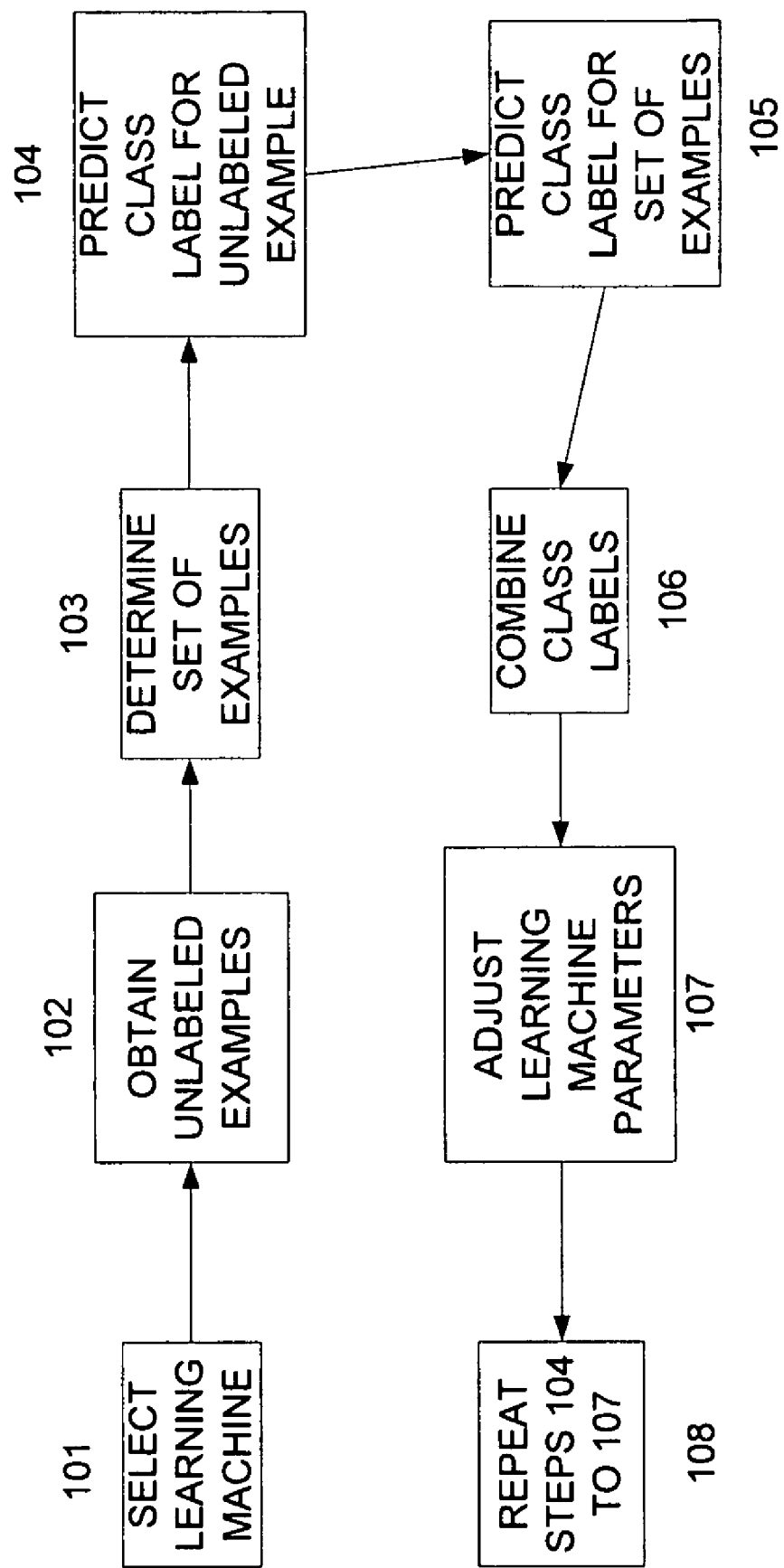
FIG. 1 is a flow chart illustrating an exemplary embodiment of a method for training a learning machine for use in discriminative classification and regression.

FIG. 1 is a flow chart illustrating an exemplary embodiment of a method for training a learning machine for use in discriminative classification and regression. The method uses a large scale manifold transductive loss function for improving generalization of the learning machine using unclassified (unlabeled) data. The method may be used to improve the error rate of any supervised learning machine, including without limitation, neural networks and support vector machines, if unlabeled data is available.

As illustrated in FIG. 1, a learning machine is selected in step 101 for training. The selected learning machine may include, without limitation, a neural network, a support vector machine and any other suitable learning machine.

A plurality of unlabeled examples or datapoints associated with a phenomenon of interest is obtained or provided in step 102. The phenomenon of interest may include, without limitation, human language, written text, an object viewed by a camera, financial information, and any other phenomenon commonly addressed in natural language processing, syntactic pattern recognition, search engines, medical diagnosis, bioinformatics, brain-machine interfaces and cheminformatics, financial analysis, speech and handwriting recognition, and object recognition in computer vision, game playing and robot locomotion.

For each unlabeled datapoint, a set of examples or datapoints associated with the phenomenon, which is likely to be in the same class as the unclassified example or datapoint, is determined in step 103. In one exemplary embodiment, each set of datapoints may be determined using a distance metric or other method that determines whether two datapoints are in the same class, e.g. neighbors. The distance metric may comprise a calculation using the k-nearest neighbors of each datapoint, as neighbors in input space are assumed to have the same class label.

In step 104, the selected learning machine predicts a class label for each unclassified datapoint received at an input of the learning machine. In step 105, the selected learning machine predicts a class label for each set of datapoints received at an input of the learning machine.

In step 106, the selected learning machine combines the predicted class labels to predict a composite class label that describes the selected unclassified datapoint and the set of datapoints. In other words, the prediction of the composite class label is a number (in the two-class case) which indicates the composite class label, either negative or positive. In one exemplary embodiment, the learning machine combines the predicted class labels by taking a mean of the prediction, i.e., a number determined by taking the average of two numbers, where each number represents one of the predicted class labels determined in step 105. In another exemplary embodiment, the learning machine combines the predicted class labels by taking a maximum prediction, i.e., a number determined by taking the largest one of the two numbers representing the predicted class labels determined in step 105.

In step 107, at least one parameter of the learning machine is adjusted according to the combined class label. In step 108, steps 104-107 are repeated until training with unclassified datapoints is completed.

In another embodiment, the method may use classified (labeled) and unclassified (unlabeled) data for training the learning machine. This embodiment of the method may be expressed formally as the following algorithm (equation 1): minimize $$\frac{1}{L}\sum_{i=1}^{L} l(f(x_i), y_i) + \frac{\lambda}{U^2}\sum_{i,j=1}^{U} W_{ij} l(f(x_i^*), y^*(\{i, j\})) \quad (1)$$

where $$y^*(N) = \text{sign}\left(\sum_{k \in N} f(x_k^*)\right) \quad (2)$$

and where the edge weights $W_{ij}$ define pairwise similarity relationships between unlabeled examples $x^*$.

The algorithm (equation 1) may be implemented using a plurality of algorithmic selections. Specifically, the function is minimized in the primal by stochastic gradient descent. This allows semi-supervised learning to be performed online in real time. In addition, a multi-layer architecture is used for defining f(x), in nonlinear applications. This makes training and testing much faster than in kernel based learning machines, such as transductive support vector machines (TSVM). Further, a specific recommendation is made herein about which type of a balancing constraint to use.

In the algorithm of equation 1, a new loss function is proposed for the unlabeled datapoints:

$$l^*(f(x_i^*)) = l(f(x_i^*), y^*(N))$$

where N is a set of datapoints that is likely to share the same label, e.g. a set of neighboring datapoints. The function $y^*$ predicts the label of that set by taking the mean prediction. Alternatively, a weighted prediction of the form: $y_i^*(N) = \text{sign}(\Sigma_{k \in N} W_{ik} f(x_k^*))$ may be used to predict the set. For both labeled and unlabeled training data we use a hinge loss function $l(f(x), y) = \max(0, 1 - yf(x))$. which is implemented in support vector machines (SVMs). In the equation $f(x) = w \cdot x + b$, pairs of datapoints are considered, weighted by the graph $W_{ij}$. If $W_{ij}=1$ and $W_{ij}=0$ for $i \neq j$ then a TSVM loss function is recovered:

$$l^*(f(x_i^*)) = l(f(x_i^*), \text{sign}(f(x_i^*)))$$

because neighborhood information is not accounted for.

Setting $W_{ij}=1$ if $x_i^*$ and $x_j^*$ are neighbors, and zero otherwise, the algorithm becomes a natural generalization of a TSVM that regularizes using neighborhood information. It is a similar regularizer to the neighborhood-based manifold regularizers, but based on clustering rather than embedding.

In the present method, the assumption is made that if two datapoints are neighbors, they have the same class label, whereas manifold-based regularization assumes they are close in an embedding space. The constraint used in the present method is not as strict, but captures the prior knowledge we have which we can use to influence the design of the algorithm. For example, if one class of data has more variance than the other, then the regularization of Laplacian SVMs which minimize:

$$\min_{w,b} \sum_{i=1}^{L} l(f(x_i), y_i) + \gamma \|w\|^2 + \lambda \sum_{i,j=1}^{U} W_{ij} \|f(x_i^*) - f(x_j^*)\|^2$$

might focus on that class, and ignore the other.

Extensions of the algorithm of equation 1 are also possible. First, in the multi-class case where f(x*) outputs a c-dimensional vector, $$y^*(N) = \text{argmax} \sum_{k \in N} f(x_k^*)$$

can be defined. Further, if the set N contains more than two examples then the present algorithm takes into account a neighborhood in analogy to k-nearest neighbor. This is not easily possible with a Laplacian SVM which is limited to pairs.

The present method may also be considered in a co-training like framework: if the set N contains datapoints with different views of the data, the present classifier may make better local predictions. In this context, it may be beneficial to predict the most confident label of all the datapoints in N, rather than the mean prediction.

As discussed in the Background Section, the issue that makes existing algorithms computationally expensive in the nonlinear case is their choice of the kernel expansion. The present algorithm solves this problem by using a multi-layer model of the form:

$$f(x) = \sum_{i=1}^{d} w_i^0 h_i(x) + b$$

where typically one chooses hidden units $$h_i(x) = S\left(\sum_j w_j^i x_j + b^i\right)$$

where S is a non-linear squashing function, and using the Hard Tanh function:

$$S(x) = \begin{cases} 1 & \text{if } x \geq 1 \\ -1 & \text{if } x \leq -1 \\ x & \text{otherwise} \end{cases}$$

In the multi-class case, one output $f_i(x)$ is defined for each class, but each function $f_i$ shares the same hidden units $h_j$, as is often done in neural network models. The flexibility of using multi-layer architectures also allows encoding prior knowledge in the present method.

In the present method, the objective is optimized online, in the primal, using stochastic gradient descent. To simplify the hyperparameters, the present method fixes λ=1. If the model is multi-layered then backpropagation is used during the gradient step. A typical stopping criteria is to use a validation set or to measure the objective function value.

The method and algorithm (equation 1), which uses both labeled (classified) and unlabeled (unclassified) data and may also be stated, without balance constraints as:

Input: labeled data $(x_i, y_i)$ and unlabeled data $x_i^*$
Repeat
   Pick a random labeled example $(x_i, y_i)$
   Make a gradient step to optimize $l(f(x_i), y_i)$
   Pick a random unlabeled example $x_i^*$
   Pick a random neighbor $x_j^*$ of $x_i^*$
   Make a gradient step for $l(f(x_i^*), y^*(\{i,j\}))$
until stopping criteria is met.

To implement a balancing constraint while learning online, a cache of (arbitrarily) the last 25c predictions $f(x_i^*)$ are kept where c is the number of classes. The next prediction is made balanced assuming a fixed estimate Pest(y) of the probability of each class, which without further information, can be estimated from the labeled data:

$$Ptrn(y = i) = \frac{|\{i: y_i = i\}|}{L}.$$

Then, two alternatives are considered. In the first alternative, the term ∇bal may be added to the objective function multiplied by a scaling factor as in ∇TSVMs. The disadvantage of such an approach is that the scaling factor is a further hyperparameter. In the second alternative, referred to herein as "ignore-bal," examples in the cache are counted which have been attributed to each class. If the next unlabeled example x* is given a label y* by the model that already has too many examples assigned to it, then a gradient step is simply not made for this example.

The quality of Ptrn depends on the ratio of labeled examples L to the number of classes c, not the input dimensionality d. Thus it may not be a good estimate in many real datasets. Therefore, a method Pknn may be performed, which comprises labeling the k nearest neighbors of each labeled example with its label. If k is large enough some labeled points will label the same examples, and so when the number or points assigned to each class are counted, a smoothed version of Ptrn is achieved.

The methods described herein may be executed in software, hardware, a combination of software and hardware, or in other suitable executable implementations. The methods implemented in software may be executed by a processor of a computer system or by one or more processors of one or more associated computers or computer systems connected to the computer system.

The computer system may include, without limitation, a mainframe computer system, a workstation, a personal computer system, a personal digital assistant (PDA), or other device or apparatus having at least one processor that executes instructions from a memory medium.

The computer system(s) may include one or more memory mediums on which one or more computer programs or software components implementing the methods described herein may be stored. The one or more software programs which are executable to perform the methods described herein, may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

Figure 2:
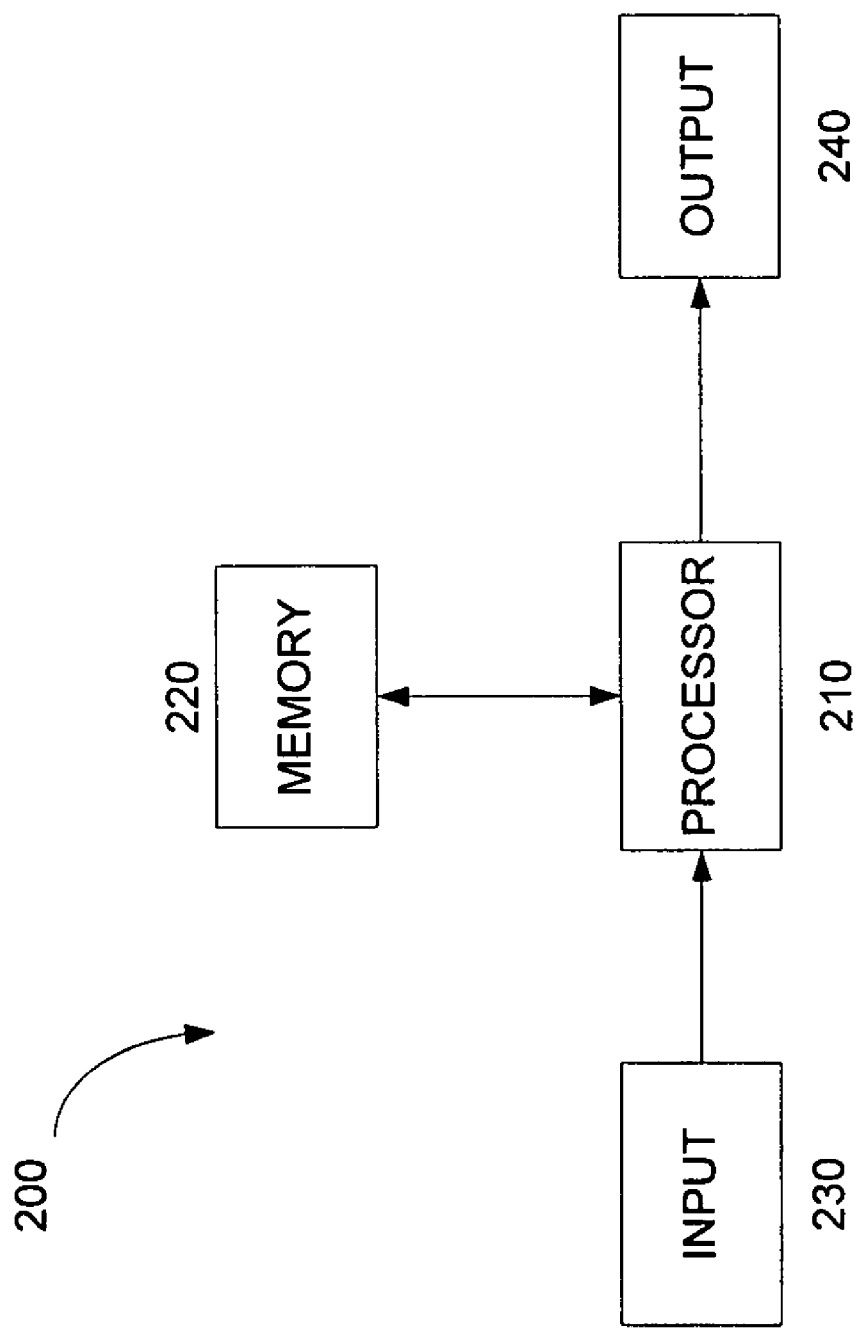
FIG. 2 is a block diagram of an exemplary embodiment of a computer system which may be used for performing the methods described herein.

FIG. 2 is a block diagram of an exemplary embodiment of a computer system 200 which may be used for performing the methods described herein. The computer system 200 includes a processor 210, a memory 220 for storing one or more programs which are executable by the processor for performing the methods described herein, an input 230 for receiving input data (e.g., the unlabeled and labeled training data), and an output for 240 for outputting data (e.g., the predicted class labels).

While exemplary drawings and specific embodiments have been described and illustrated herein, it is to be understood that that the scope of the present invention is not to be limited to the particular embodiments discussed. Thus, the embodiments shall be regarded as illustrative rather than restrictive, and it should be understood that variations may be made in those embodiments by persons skilled in the art without departing from the scope of the present invention as set forth in the claims that follow and their structural and functional equivalents.

What is claimed is:

1. A method for training a neural network for use in discriminative classification and regression, the method comprising the steps of:
   randomly selecting, in a computer process, an unlabeled datapoint associated with a phenomenon of interest;
   determining, in a computer process, a set of datapoints associated with the phenomenon of interest that is likely to be in the same class as the selected unlabeled datapoint;
   predicting, with the neural network in a computer process, a class label for the selected unlabeled datapoint;
   predicting, with the neural network in a computer process, a class label for the set of datapoints, the class label comprising a number;
   combining the predicted class labels in a computer process, by taking a mean of the class labels, to predict a composite class label that describes the selected unlabeled datapoint and the set of datapoints; and
   using the combined class label to adjust at least one parameter of the neural network in a computer process.

2. The method of claim 1, wherein a gradient descent computer process is performed online for a loss function $l(f(x_i^*), y^*(\{i,j\}))$ for the unlabeled datapoint, where $l(f(x_i^*))$ is the prediction of the neural network, $x_i^*$ is the randomly selected unlabeled datapoint, and $y^*(\{i,j\}))$ is a function predicting the class label of the set of datapoints.

3. The method of claim 1, wherein the determining step is performed with a distance metric.

4. The method of claim 3, wherein the distance metric comprises calculating k-nearest neighbors of the unlabeled datapoint.

5. The method of claim 1, wherein the determining and predicting steps are performed online.

6. The method of claim 1, further comprising the steps of:
   randomly selecting, in a computer process, a labeled datapoint associated with the phenomenon of interest; and predicting, with the neural network in a computer process, a second class label using the randomly selected labeled datapoint.

7. The method of claim 6, wherein the step of using the combined class label to adjust the at least one parameter of the neural network in a the computer process also uses the second class label.

8. The method of claim 1, further comprising the step of applying a constraint to balance the prediction of the class label for the selected unlabeled datapoint.

9. An apparatus for use in discriminative classification and regression, the apparatus comprising:
- an input device for inputting unlabeled datapoints associated with a phenomenon of interest;
- a processor; and
- a memory communicating with the processor, the memory comprising instructions executable by the processor for training a neural network by:
  - randomly selecting one of the unlabeled datapoints associated with the phenomenon of interest;
  - determining a set of datapoints associated with the phenomenon of interest that are likely to be in the same class as the selected unlabeled datapoint;
  - predicting with the neural network a class label for the selected unlabeled datapoint;
  - predicting with the neural network a class label for the set of datapoints, the class label comprising a number;
  - combining the predicted class labels by taking a mean of the class labels to predict a composite class label that describes the selected unlabeled datapoint and the set of datapoints; and
  - using the combined class label to adjust at least one parameter of the neural network.

* * * * *